March 2, 1971     W. H. BRAHM     3,566,708
TRANSMISSION PERMITTING CHANGE OF INPUT/OUTPUT RATIO
Filed Nov. 4, 1968     8 Sheets-Sheet 1

INVENTOR.
WALTER H. BRAHM
BY
ATTORNEY

United States Patent Office 3,566,708
Patented Mar. 2, 1971

3,566,708
TRANSMISSION PERMITTING CHANGE OF INPUT/OUTPUT RATIO
Walter im Brahm, Mulheim (Ruhr), Germany, assignor to Walter H. Brahm, Mulheim (Ruhr), and Maschinen- und Werkzeugbau G.m.b.H., Dortmund-Hombruch, Germany
Filed Nov. 4, 1968, Ser. No. 773,087
Claims priority, application Germany, Nov. 2, 1967, P 16 50 781.6
Int. Cl. F16h 35/02
U.S. Cl. 74—393                                    13 Claims

ABSTRACT OF THE DISCLOSURE

A transmission and, more particularly, a gear drive for changing the speed of rotary motion with or without changing its direction of rotation.

BACKGROUND OF THE INVENTION

The present transmission is a gear drive for changing the angular velocity of rotary motion with or without a change of turning direction. The transmission of power is brought about by engagement of all elements of the drive which take part in the transmission without the interposition of elastic or liquid transfer units. Gear drives of this type (by which a rotary motion with a fixed motion characteristic which repeats periodically and changes also into a periodical motion of changed character) are used in the technical world as built-in units for a number of machines. They are especially used for the manufacturing of apparatus, for conveyor devices, and where certain operation procedures of another apparatus must be executed. It is well known to bring about a regular cycle of change of an introduced motion in the form of an acceleration or a deceleration by the use of crank gears or steering gears, gear wheels with elliptically-formed divided circles, or their combinations. The form and design of such gear drives have the disadvantage that their range of application during high velocities is limited because of the high acceleration appearing in certain ranges of the gear drive, so that the arrangement is only suitable for certain limited purposes. Gear drives, which bring about a part-time stoppage of the second drive during the cycle are known as Geneva transmissions and have the shape of star wheel gears. The gear drives with interrupted worm gears can be used only occasionally because of the forces imposed during the repeated acceleration and deceleration at high speeds. Geneva drives present difficulties in design, not only because the shape of the teeth of the cross arms must be carefully calculated and designed for each application, but also because the locking for each application and a quiet operation of the gear drive may be guaranteed only by using a larger number of stations, which naturally increases the fabrication costs considerably. A reduction in the cost of manufacturing by producing large quantities is not possible economically, because these gear drives have little freedom in design. At a given number of stations and given axis distance, all dimensions and kinematic values, including the distribution of movement and stand still, are determined. Star wheel gears offer a larger application possibility, since the desired stoppage time may be selected freely; the limits of the application possibilities are in the unfavorable kinematic relations, which limit the use for higher speeds. Gear drives for intermittent use with an interrupted worm gear have exceptionally high fabrication costs and are not suitable for high speeds, as already mentioned; additionally, the wear on such gears is very high. These and other difficulties experienced with the prior art devices have been obviated in a novel manner by the present invention.

It is, therefore, an outstanding object of the invention to provide a transmission for converting rotary motion of a given speed of rotation to another speed and/or direction.

Another object of his invention is the provision of a rotary speed and direction converting transmission which can be manufactured inexpensively and which is relatively wear-free.

A further object of the present invention is the provision of a rotary transmission which can be operated over a wide range of speeds without exceptional stress being applied to the elements.

It is another object of the instant invention to provide a transmission capable of adaptation to a multitude of applications without re-design, so that the advantages of mass production can be realized.

With these and other objects in view, as will be apparent to those skilled in the art, the invention resides in the combination of parts set forth in the specification and covered by the claims appended hereto.

SUMMARY OF THE INVENTION

In general, the transmission is provided with programmed changes of the angular velocity of the secondary drive or output shaft. This is done in such a way that the output drive shaft has one or several straight line guide tracks with pusher members which are guided by guide lugs in circular or curved tracks that are transversely movable relative to the axis of rotation of the output shaft. These are in driving contact with the secondary drive member. With this design, the speed tnd direction of the transverse movement of the circular tracks can be changed during the operation of the apparatus by a programmed motor drive. In certain cases, the program sequence may itself be determined by values taken from the output shaft. The programs themselves can be changed for the same basic drive without any difficulty in such a way that the carrier of the curved tracks are designed as exchange or circular track holders which contain a number of curved tracks which may be brought selectively into the operation zone.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
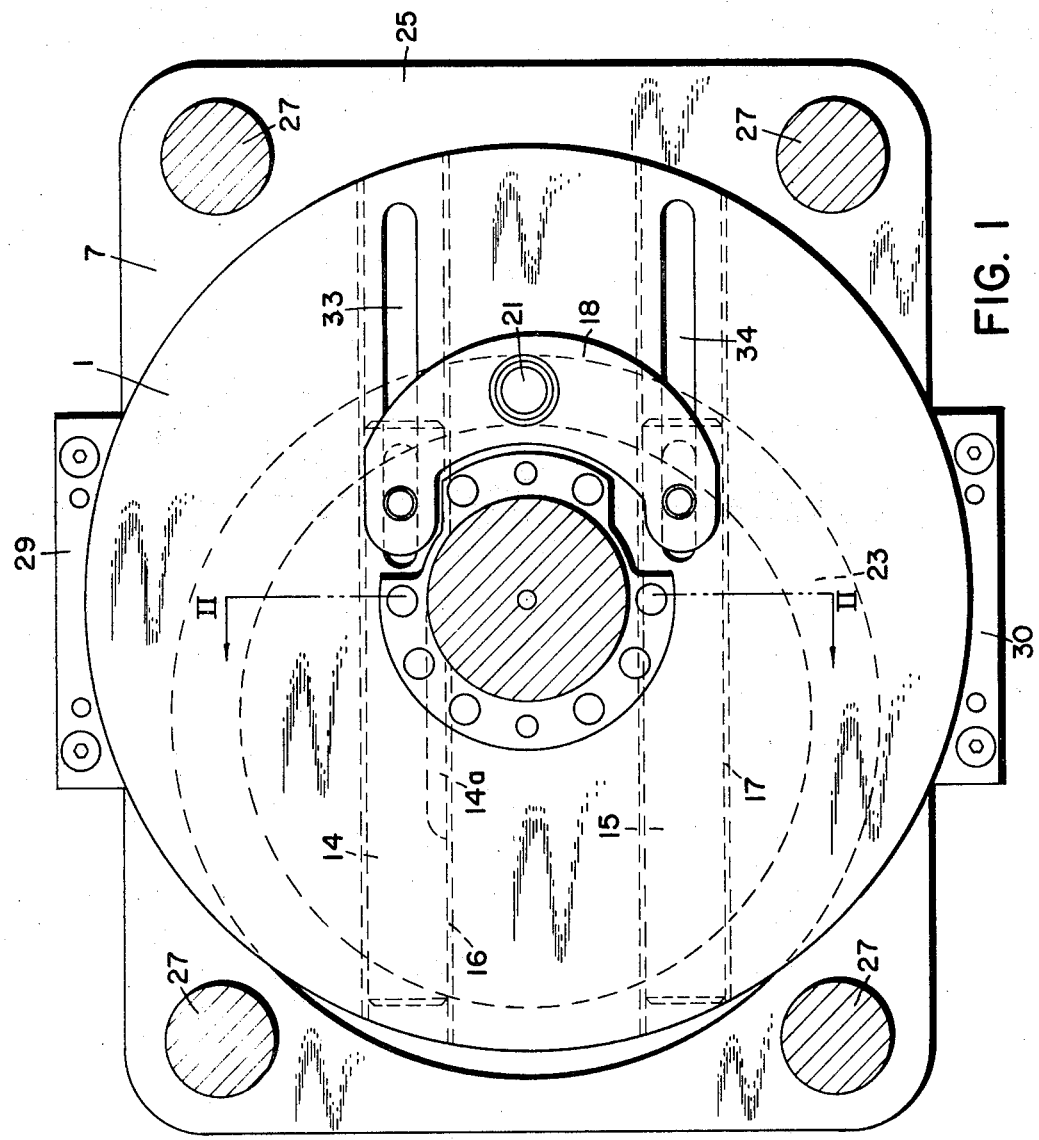
FIG. 1 is a transverse sectional view of a portion of a transmission embodying the principles of the present invention, taken on the line I—I of FIG. 2.
Figure 2:
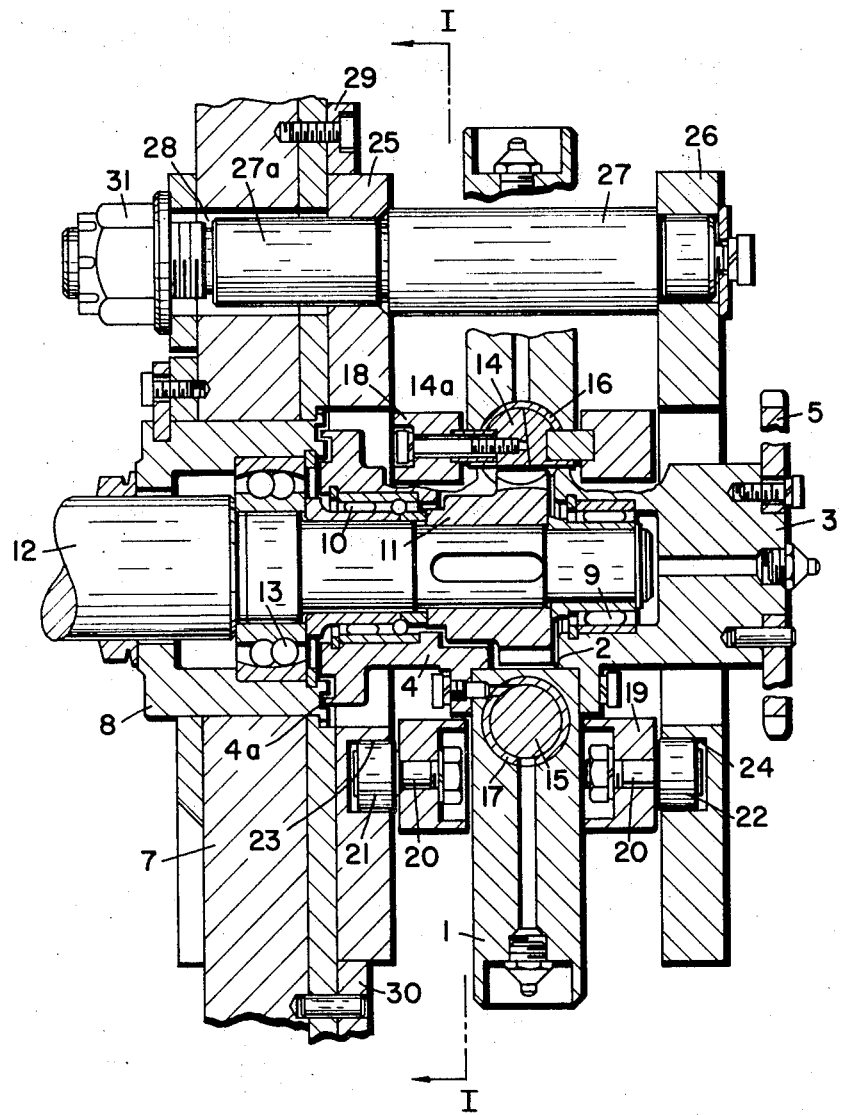
FIG. 2 is a longitudinal vertical sectional view of the transmission taken on the line II—II of FIG. 1.

Referring first to FIGS. 1 and 2, which show one embodiment of the invention, a disc body 1 has a center bore 2 and on its periphery are attached hollow hub attachments 3 and 4. The attachment 3 carries a sprocket wheel 5 which forms the input drive, and the other attachment engages with a ring rim 4a on a carrier plate 7. The plate is fastened to the face rim of a bearing carrier 8 mounted. Into both hollow hubs are inserted bearings 9 and 10 which are mounted on a gear pinion 11 and which rest in back of the pinion. Consequently, the disc body 1 may move freely on an output drive shaft 12. The drive shaft 12 itself is supported by a bearing 13 on the bearing carrier 8 mounted in carrier plate 7. Pusher members 14 and 15 made from round stock are supported on opposite sides of the rotating axis at equal distances from the center of the axis. They reside in parallel slide sleeves 16 and 17 within the disc body 1 and are movable. The pusher member 14 is formed with a rack which engages pinion 11 located in bore 2. The other member 15 serves simply as a guide member. The pusher members are fixedly connected with each other by brackets 18 and 19 which lie on opposite sides of the disc body 1. These brackets carry on their outer sides freely-rotatable rolls 21 and 22 which are mounted on bolts 20 and lie in the grooves 23 and 24 located in discs 25 and 26. These dscs are arranged on opposite sides of the rotating disc body 1 in parallel planes and are joined by bolts 27 to form a frame. The bolts 27 are bolted with a recess 27a to the carrier plate 7 and are also kept in place by guide bars 29 and 30 screwed also to the carrier plate 7. The discs 25 and 26 are equipped with curved grooves 23 and 24 and may be adjusted transversely of the axes of the drive 3 and of the secondary drive 12 while guided by the bars 29 and 30 after loosening a nut 31. The brackets 18 and 19 move along the two slots 33 and 34. They are arranged between the circle segments forming the guide track for guide members with the inside of the rectangular plates 25 and 26 arranged parallel to each other and the guide members having the form of a square.

Figure 3:
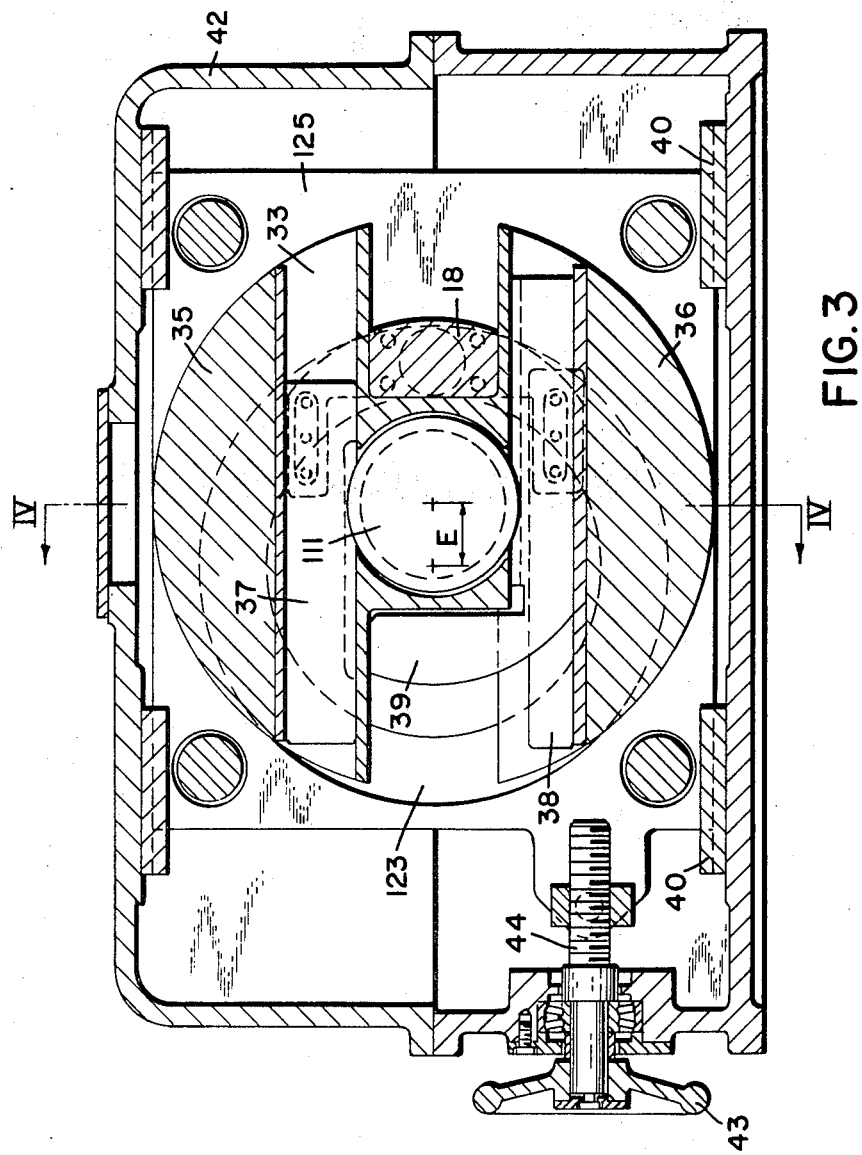
FIG. 3 is a transverse vertical sectional view of a modification of the transmission taken on the line III—III of FIG. 4.
Figure 4:
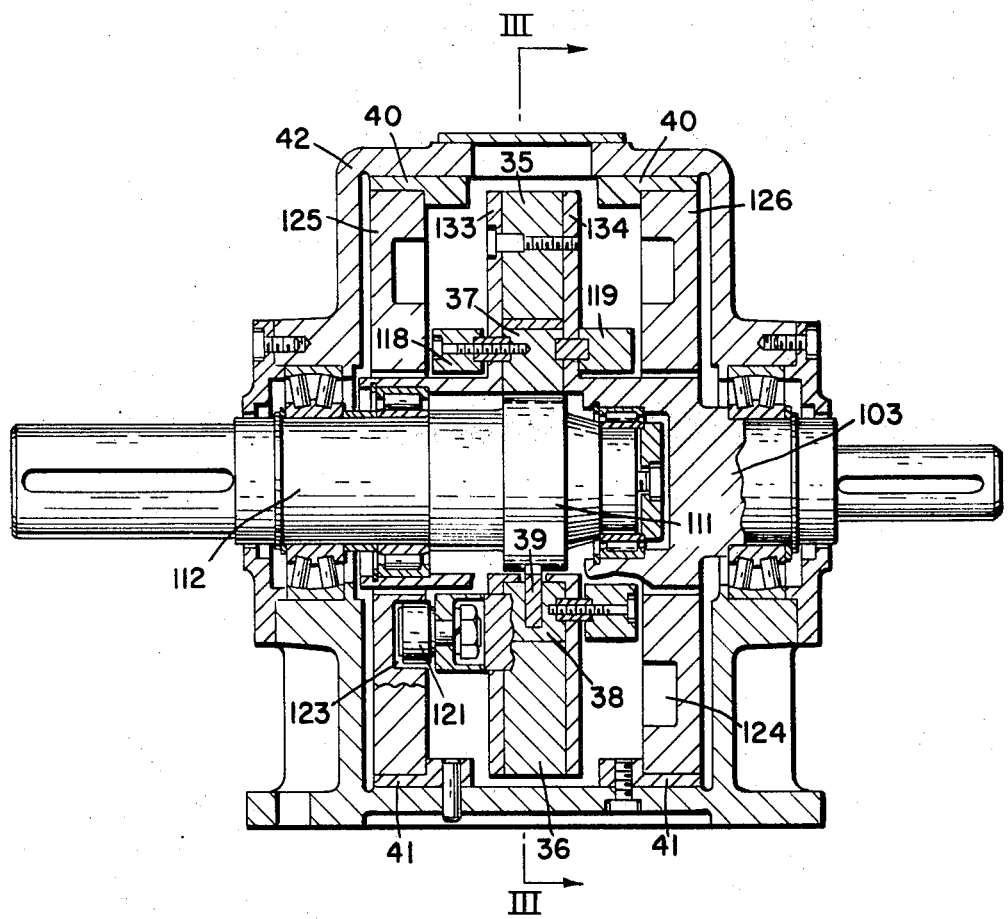
FIG. 4 is a longitudinal sectional view taken on the line IV—IV of FIG. 3.

In FIGS. 3 and 4, the form of the transmission shown there has brackets 118 and 119 which move along two plates 133 and 134 and are arranged between circular segments 35 and 36 forming a guide track for guide members 37 and 38. The inside surfaces of the circular discs are arranged parallel to each other and the guide members have the form of a square. Into these square bars are inserted special tooth discs 39. The disc pair 125 and 126 have curve grooves 123 and 124, are guided by an angle track pair 40 and 41 in a special housing 42. They may be moved transversely relative to the rotating axis of drive and secondary drive 103 and 112. A hand wheel 43 on a drive spindle 44 is positioned in the housing 42. In place of the hand driven wheel, a motor drive could be used, which could bring about the movements in accordance with a predetermined program. This program may again be determined by the rotary movements of the input drive shaft and the output drive shaft.

Figure 5:
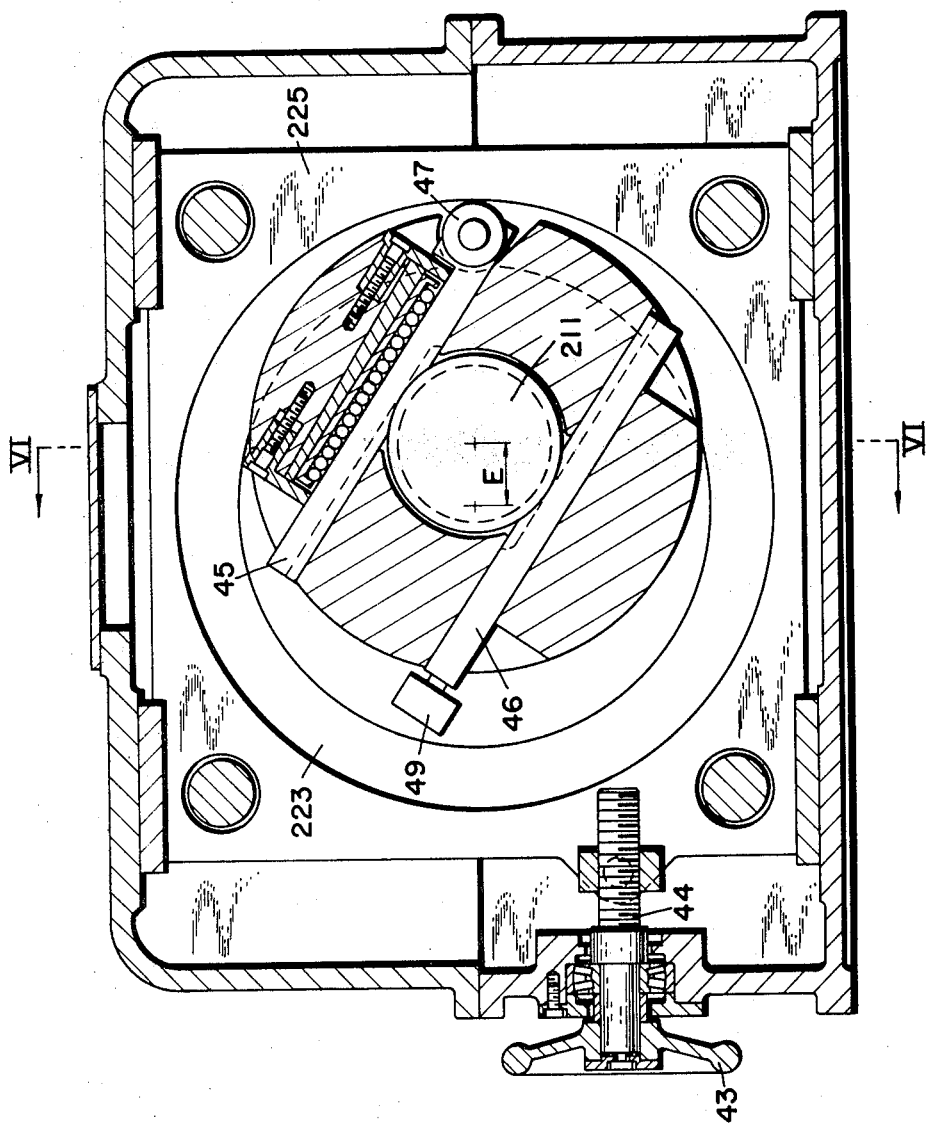
FIG. 5 is a transverse sectional view of a still further form of the invention, taken on the line V—V of FIG. 6.
Figure 6:
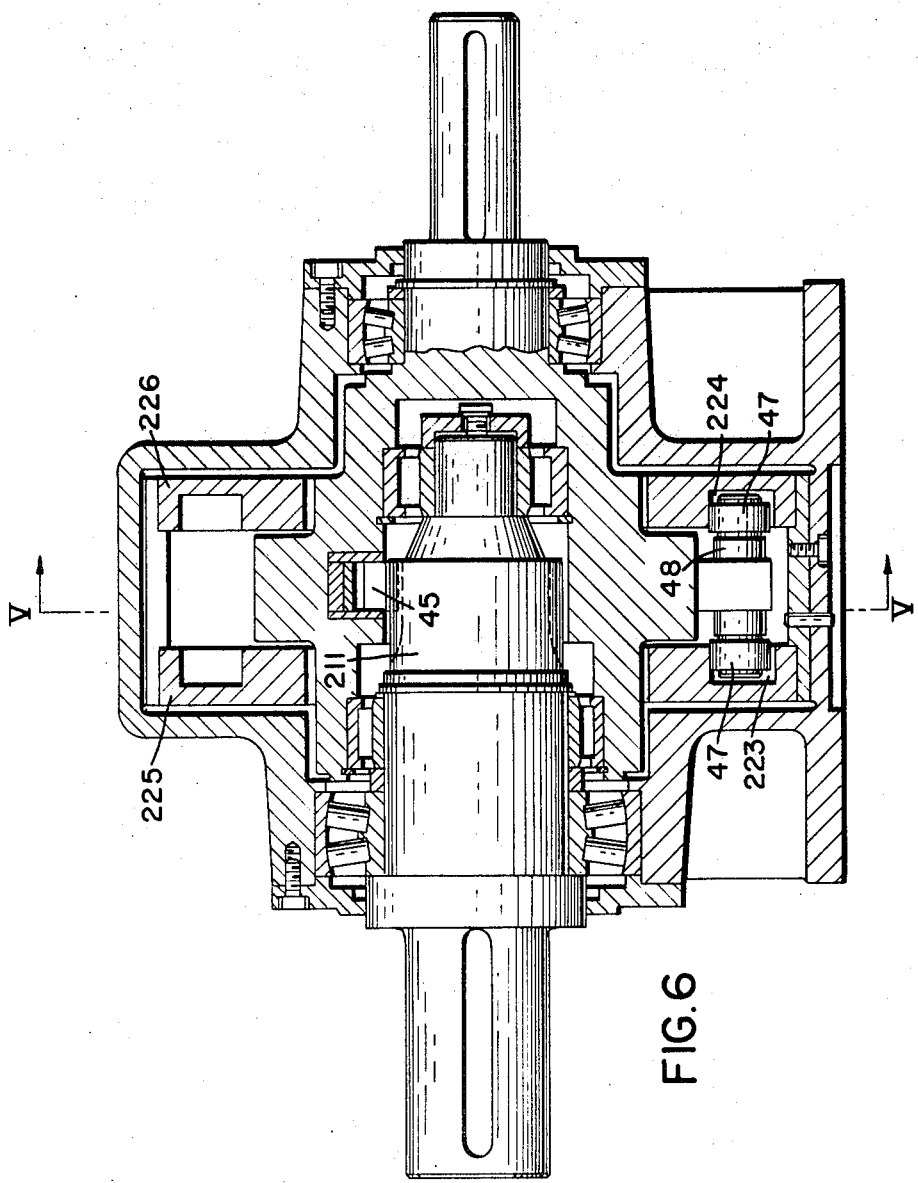
FIG. 6 is a longitudinal sectional view of the transmission shown in FIG. 5 taken on the line VI—VI thereof.

In the design shown in FIGS. 5 and 6, guide member gear racks 45 and 46 are not connected with each other by brackets; however, they themselves carry guide rolls 47 on a shaft 48. In this design, only one of the gear racks is guided in curved grooves 223 by the rollers 47. The other gear rack 46 carries only a counter-balance weight 49. The displacement guide for the discs 225 and 226 is the same as that shown in FIGS. 3 and 4.

Figure 7:
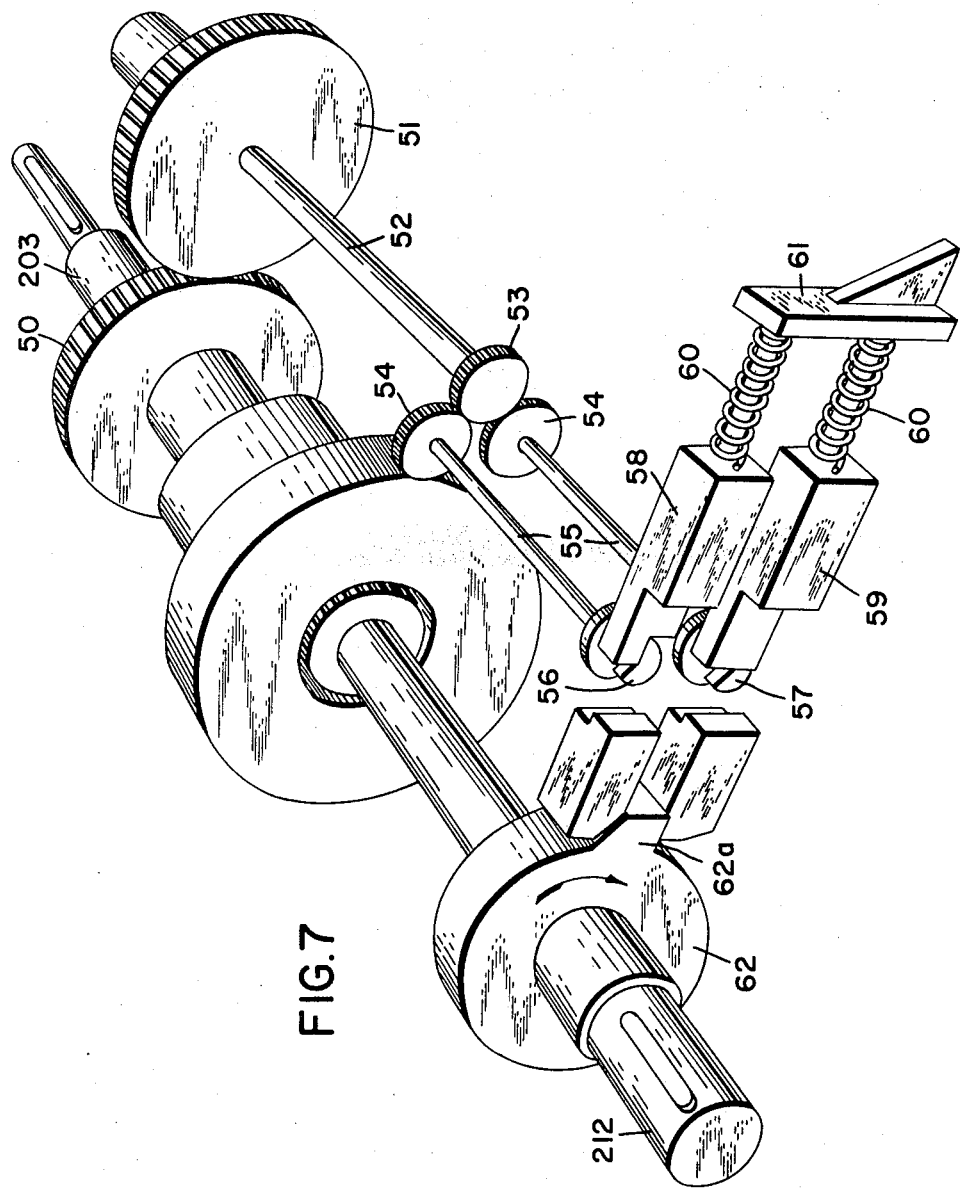
FIG. 7 is a perspective view of another form of the transmission, showing only the important operative elements.

The arrangement of the arresting element shown in FIG. 7 consists of a gear wheel 50 placed on the input shaft 203. The gear wheel 50 engages a gear wheel 51 mounted on a parallel shaft 52. The shaft 52 drives a double gear drive 53, 54 and on two drive shafts 55 are arranged curved discs 56 and 57. Their curve areas are in operating connection with two lock bolts 58, 59. The lock bolts will be brought out of the position shown in the drawing into the rotation path of a cam 62a of a cam disc 62 positioned on the output shaft 212 with the help of the curved discs in opposition to the action of springs 60 fixedly supported at 61. Through the corresponding shape of the curved discs 56, 57, the cam disc 62 (having the rotative position of the secondary drive 212 and having the moving characteristic of the drive 212 which is at a standstill for a certain amount of time) may be fixed in stop position by the activated lock bolts. The curved discs have to be formed in such a way that, in accordance with the direction of turning of the secondary drive 212 (corresponding to the arrow shown), first the lower lock bolt 59 reaches the operation position as a stop bolt and, thereafter, the upper lock bolt 58 as a fixing bolt. In reverse movement of the lock bolts, first the lower bolt 59 is pulled back suddenly and, thereafter, the upper lock bolt is pulled back slowly.

Figure 8:
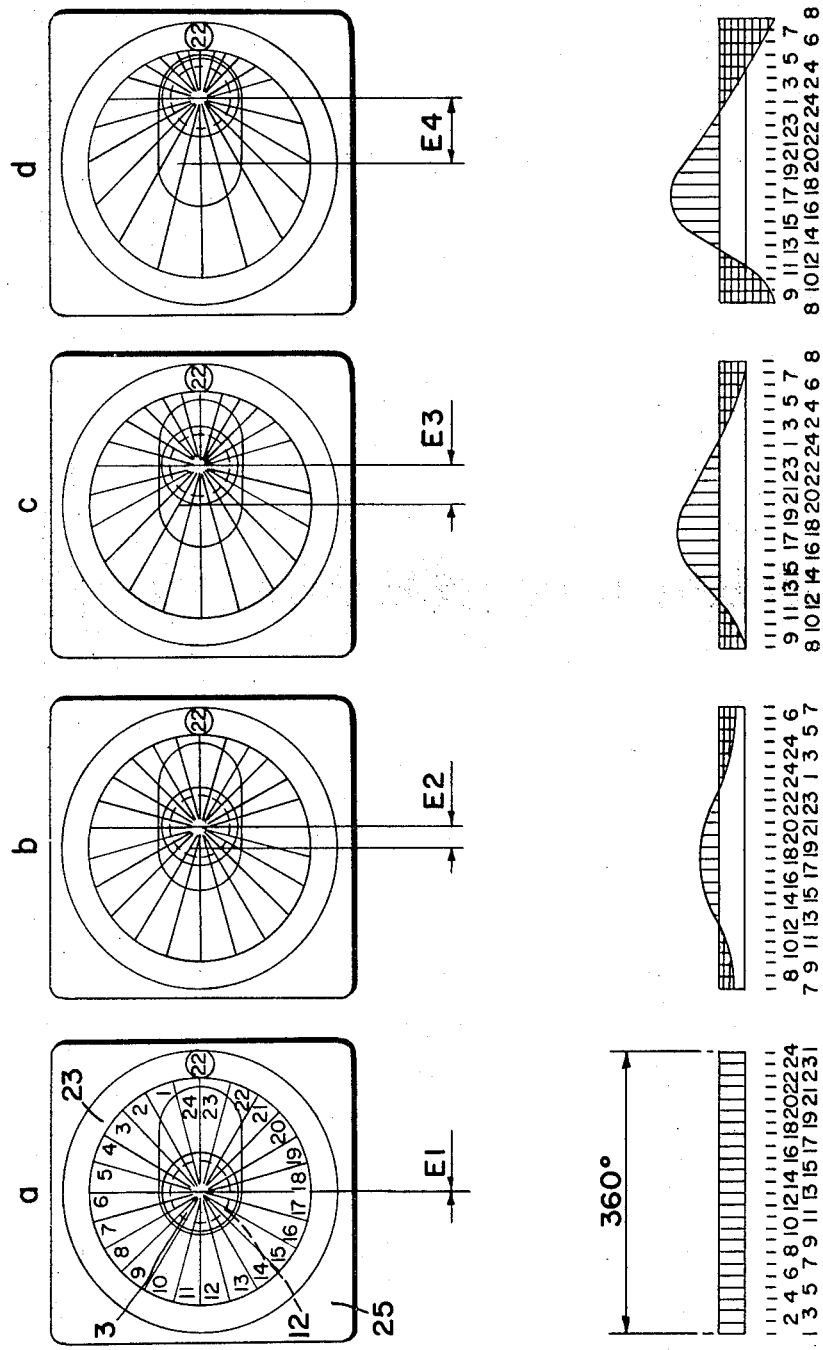
FIGS. 8a, 8b, 8c, and 8d are graphic illustrations of the operation of the transmission.

The schematic FIGS. 8a to 8d show some changeable characteristics obtained with a transmission built in accordance with the invention in operating the drive member at constant angular velocity in the same direction of rotation. In case the eccentricity E1, according to picture a equals 0, that is, the center point of the curve grooves 23, 24 as used in the construction shown in FIGS. 1 and 2 is positioned within the axis of the input shaft 3 and output shaft 12 by adjustments of the plates 25, 26. The secondary drive member or output shaft turns with the same angular velocity as the input shaft. The transmission has only the function of a coupling in this limiting case. If the eccentricity is brought to the magnitude E2 as shown in FIG. 8b, then the angular velocity of the output shaft changes by a constant angular velocity of the driving member over a turn angle of 360° according to a sine curve, rising up to a maximum value without any change of direction occurring. By a further enlargement of the eccentricity to a value E3, the rise of the angular velocity becomes correspondingly steeper and further enlargement to a value E4 results in a stoppage after each rise and descent of the angular velocity at the zero value, with a later change of turn direction of the output shaft 12. After that, there is a corresponding velocity rise and descent in the opposite direction.

By introduction of a changing angular velocity and a corresponding change in direction of rotation into the input shaft 3, many other variations of the output characteristics may be achieved; this may be done, for example, by adding one or more transmissions of the present design in line with the drive of the above-described transmission.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A transmission, comprising
    (a) a housing in which are mounted an input and an output shaft in alignment,
    (b) a straight-line guide track mounted in the housing adjacent the output shaft,
    (c) pusher members mounted near the track and equipped with guide lugs,
    (d) a curved track in which the guide lugs are guided, the curved track being mounted and guided for transverse adjustment relative to the axis of rotation of the input and output shafts, and
    (e) means drivingly connecting the shafts to the curved track.

2. A transmission as recited in claim 1, characterized by the fact that a programmable motor drive mounted on the housing to change the velocity and direction of transverse movement of the curved track during the operation of the apparatus.

3. A transmission as recited in claim 2, characterized by the fact that the program sequence of the motor is determined by values derived from one of the shafts.

4. A transmission as recited in claim 1, wherein a carrier of the curved tracks is designed as a circular track holder and contains a number of curved tracks which may be brought selectively into operating position.

5. A transmission as recited in claim 1, wherein a plurality of transmissions are connected in series.

6. A transmission as recited in claim 1, wherein the guide tracks operate in parallel pairs on both sides of the axis of rotation of the shafts at the same distance therefrom.

7. A transmission as recited in claim 1, wherein at least one of the pusher members is equipped with a tooth engaging with a tooth arranged on the output shaft.

8. A transmission as recited in claim 1, wherein the pusher members are connected in pairs by a solid bracket having the guide lugs.

9. A transmission as recited in claim 8, wherein only one of the pusher members is equipped with a guide lug and the other pusher member carries a counter balance weight.

10. A transmission as recited in claim 1, wherein the input shaft is designed as a rotating body having a center bore for carrying a pinion of the output shaft and is also equipped with hollow hubs to carry bearings arranged on either side of the pinion and carrying the disc, and wherein the pusher members are slidably supported within the disc and guided tangentially by engagement with the pinion.

11. A transmission as recited in claim 10, wherein the input and output shafts extend into a housing whose walls extend transversely of the axis of rotation and wherein movable discs are supported by the pusher member lugs in a curved guide track.

12. A transmission as recited in claim 11, wherein the disc is designed as a movable sled moved by the spindle guide arranged in the housing.

13. A transmission as recited in claim 12, wherein the rotating disc body consists of a pair of circular discs and wherein circular segment plates are arranged between them, the parallel sides having the same distance from each other and forming the guide tracks for pusher members in the form of bars having a square cross-sectional shape.

References Cited
UNITED STATES PATENTS

| | | | |
|---|---|---|---|
| 3,326,058 | 6/1967 | Morrison | 74—393 |
| 3,377,865 | 4/1968 | Weiss | 74—393 |

LEONARD H. GERIN, Primary Examiner